Sept. 24, 1957  T. Q. NEY  2,807,183
PORTABLE DEVICE FOR TEACHING MUSIC
Filed Oct. 1, 1954  2 Sheets-Sheet 1
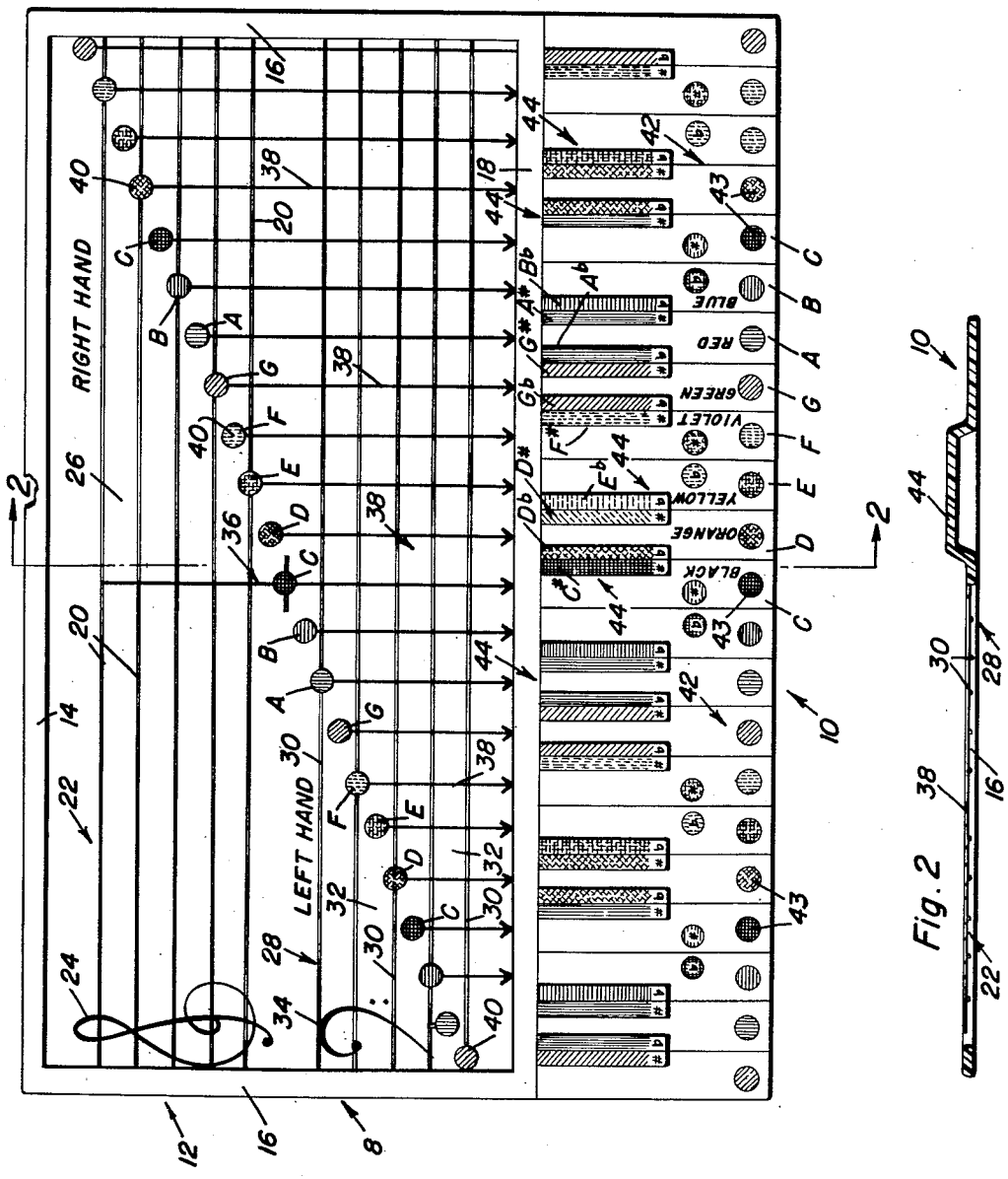
Theresa Q. Ney
INVENTOR.

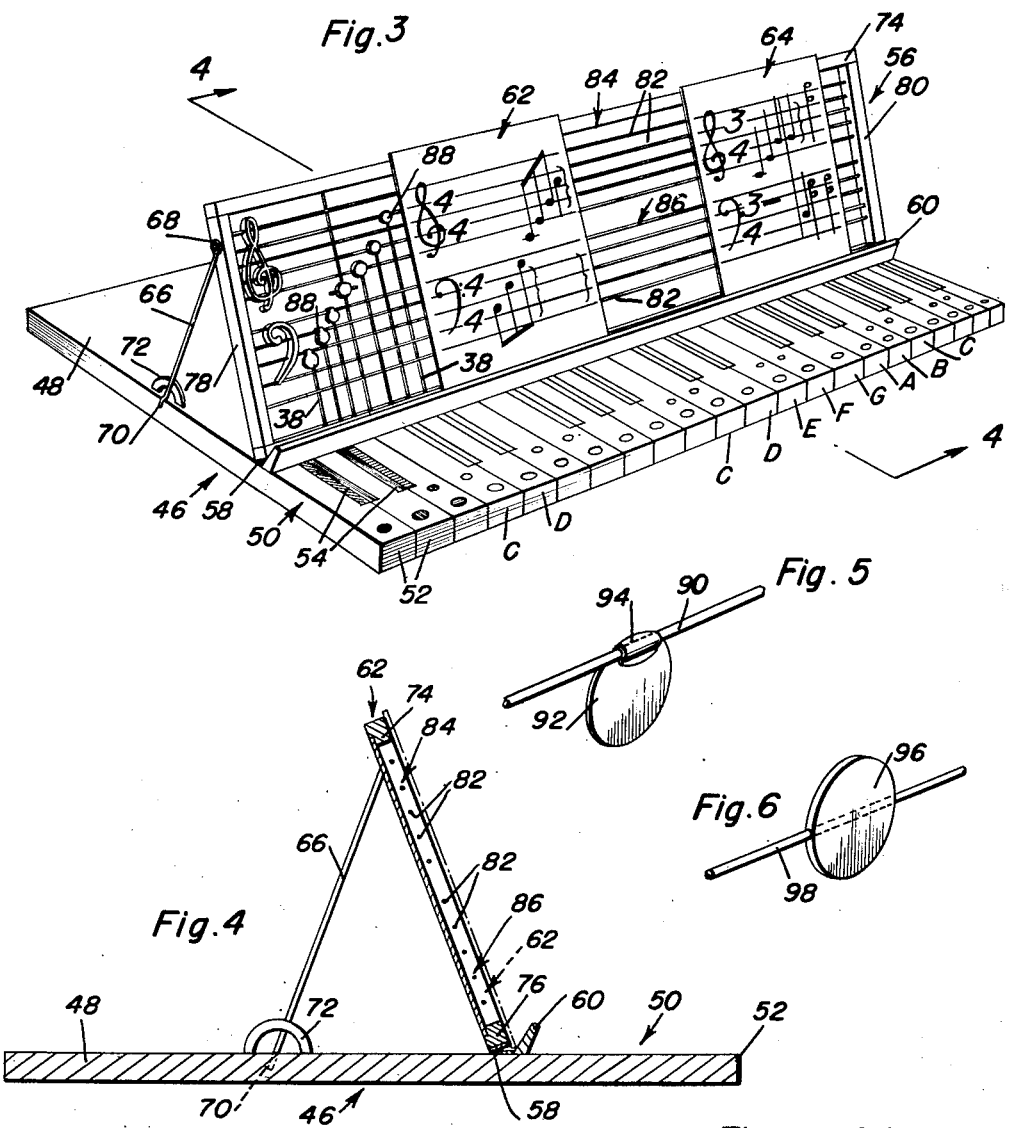

2,807,183
PORTABLE DEVICE FOR TEACHING MUSIC

Theresa Q. Ney, Tiverton, R. I.

Application October 1, 1954, Serial No. 459,659

2 Claims. (Cl. 84—471)

The present invention appertains to structurally and functionally novel ways and means by way of which a classroom instructor, teacher or other person who is satisfactorily qualified, may effectually teach one or more students, pupils in a classroom, for example, the art involving musical knowledge, that is, certain fundamental and basic essentials, this in an interesting and game-like mode of approach.

Stated otherwise, and perhaps more informatively, the instant concept has to do with a unique structural device and accompanying paraphernalia which is expressly devised to train the eyes and mind of one who is in pursuit of knowledge pertaining to keyboard instruments and written music prepared for use in connection therewith. That is to say, the invention has to do with an adaptation for use in imparting knowledge and developing the visual, physical and musical appreciation senses and skills required by one in recognizing and learning the coordinate association between conventional musical notes and symbols applied to a standard-type music staff, for example, the ascending, descending and other audible tones represented by the notes on the staff and the companionate relationship of the staff and notes to the keys of the keyboard, all as required by one in familiarizing himself with and learning to read music and to use a piano keyboard, organ, piano accordion or the like.

In carrying out the underlying principles of the over-all invention, two embodiments are herein presented. Generically construed, either or both devices may be set forth as characterized by a portable structure comprising a dummy keyboard having keys which are imitative of the usual white keys and their auxiliary (sharps and flats) black keys of a standard-type keyboard. In keeping with the ideas here, each key is made distinct and distinguishable from the others in a given single scale in that each key is provided with a colored marker or equivalent signal, and these white keys are arbitrarily identified, according to color, as black, orange, yellow, violet, green, red, blue and black again, in that order. The so-called "black" keys likewise have corresponding colors identifying the same with the colors properly displayed and utilizing the same color scheme; namely, black, orange, yellow, violet, green, red and blue, in that order. The stated structure is further characterized by complemental frame means having grouped wires thereon providing musical staffs, bass and treble staffs, for example, and note symbols being mounted on the respective staff members in prescribed coordinate relation to the keyboard keys, said note symbols being correspondingly colored to conform color-wise to the keys with which they are related.

One simple embodiment of the invention takes the form of a plastic sheet member having a dummy keyboard and a coplanar frame, a plurality of wires stretched across said frame and grouped and spaced in parallelism and defining and providing bass and treble staffs, said keyboard embodying at least one octave including eight white keys; namely, C, D, E, F, G, A, B and C, with each key having a note-like indicator, the latter being colored black, orange, yellow, violet, green, red, blue and black again in their alphabetical sequence, and there being five complemental keys for the "playing" of accidentals such as sharps and flats and the first accidental key, above C, being black at the left and orange at the right, the second key, above D, being orange at the left and yellow at the right, the third one, above F, violet at the left and green at the right, the fourth one, above G, green at the left and red at the right, and the final and fifth one, above A, being red at the left and blue at the right, whereby the color scheme of both sets of keys harmonize when going "up" and "down" the scale, and complemental and coordinated note symbols mounted on the respective staffs and correspondingly colored and signifying the tones as well as keys C, D, E, F, G, A, B and C and being colored black, orange, yellow, violet, green, red, blue and black, said note symbols being aligned with their respective white keys.

A second or alternative embodiment of the invention, though basically similar to that already comprehended, is slightly different to the extent that it takes the form of a portable structure for student use comprising a flat base having one lengthwise edge portion fashioned to represent a dummy keyboard having imitation white and black keys, a frame having one longitudinal edge hinged to the intermediate portion of the top of said base, said frame being foldable against said top when not in use and adapted to assume an upstanding position relative to the base when it then functions as a music rack, said frame having a series of strung wires providing music staffs, distinguishably colored note symbols mounted in prescribed order on said staffs, the color scheme of said note symbols being of a desired sequence of colors and the keys on said keyboard being likewise schematically colored, and means for propping and holding said frame in its rack-forming position.

Further novelty is predicated on the aspect of the invention which has to do with placing a colored disk-like spot on each white key which resembles a note symbol and which, as a matter of fact, has the same shape and color as the note symbol with which it is coordinated on the scale, that is, on either bass or treble staff in the aforementioned construction. Also, and in keeping with this phase of the matter, each note symbol on its respective staff has a wire crossing another wire and vertically disposed in the drawings and lined up with its particular white key on the keyboard.

Of outstanding importance is the fact that the schematic color pattern which is herein employed is outstandingly unique in that the five so-called "black" keys are unusual in that the first one, that is above C, is half black and half orange, the black side being at the left, and the orange side at the right, so that the black side coordinates with the black spot on the white key C with the black half thus representing C-sharp. The orange half coordinates with the second white key having an orange spot thereon, and in descending the scale, this half is, manifestly, representative of D-flat, and this same sequence follows throughout, with the second "black" key above D being colored orange on the left half and yellow on the right half to represent D-sharp ascending the scale and E-flat descending the sale.

In the specific embodiment which utilizes a hingedly mounted frame similar to that already covered, the keyboard and frame together form a rack, that is, a rack for sheets of music, and in keeping with this aspect of the matter, the sheets of music are printed with correspondingly colored notes, that is, black, orange, yellow, etc. So, here again, an advantage of the invention is to provide structural devices which "tie in" with the sheet music so as to provide for either home use or classroom study in a reliably educational and helpful manner.

Other objects, features and advantages will become more readily apparent from the following description and the accompanying sheet of illustrative drawings.

In the drawings, wherein like numerals are employed to designate like parts throughout the views:

Figure 1 is a plan view of the simplest form of the invention in which all of the basic characteristics are utilized;

Figure 2 is a section on the line 2—2 of Figure 1, looking in the direction of the arrows;

Figure 3 is a perspective view of a modification of the invention and showing the manner in which it is set up for use;

Figure 4 is a section taken on the approximate line 4—4 of Figure 3, looking in the direction of the arrows;

Figure 5 is a perspective view on an enlarged scale showing one of the aforementioned wires and one of the note symbols and the manner in which it is mounted thereon; and Figure 6 is a view of the same, but illustrating a modification, that is, a second way of mounting the note symbol on a wire.

Attention is first invited to the form of the invention depicted in Figures 1 and 2. As before stated, this takes the form of a plastic sheet member which is denoted generally by the numeral 8. It includes a portion 10 which constitutes the dummy keyboard and a coplanar rectangular frame portion 12 embodying a longitudinal top member 14, transverse end members 16—16 and a lower longitudinal member 18 which defines the dividing point between the frame and keyboard. As already stated, the frame includes an upper set of tautly stretched wires in spaced parallel relation which are denoted at 20 and which define the treble staff 22 having the desired or conventional clef 24 suitably mounted thereon at the left. The spaces of this staff are denoted at 26. The bass staff is denoted at 28 and this is also made up of spaced parallel wires 30 with spaces 32 and with the bass clef 34. There is a cross-wire at 36 which forms a main guide "line" having an indicating arrow at the lower end. This divides the staffs more or less centrally into left and right hand areas, the left hand for the base, and the right hand for the treble, in a well known manner, and the note symbols are associated and, in fact, properly lined up with the auxiliary lines conveniently denoted by the numerals 38. The lines 38 may be said to be connected with these symbols. In this figure, that is, Figure 1, the symbols are denoted by the numeral 40, and they are also identified by their alphabetical names, such as, A, B, C, D, E, F, G, A, etc. In practice, each note symbol C is colored black. The following note symbols D, E, F, G, A, B, C are colored, respectively, orange, yellow, violet, green, red, blue and black. Corresponding and similar symbols are inlaid, or in some other manner embedded in the white keys of the keyboard 10. The white keys are here referred to handily by the numerals 42. Each key has a colored circular spot corresponding to the aforementioned note symbol and also corresponding in color. For convenience, I have shown one scale ranging from C to C in the middle register, and the proper letter characters have been applied to the keys. Also, with the aid of legends, these keys are colored, respectively, black, orange, yellow, violet, green, red and blue. The five "black" keys in each complete scale are shown as embossed or raised in Figure 2, and these are numerically designated by the numerals 44. As before stated, each key 44 is halved, that is, divided into left and right colored halves, for example, the first key 44 above middle C is colored black and represents C-sharp and the second half is colored orange and represents D-flat, and this same sequence of colors follows up and down the scale, all as already touched upon and clearly shown in the drawings.

The same color scheme in respect to black and white keys and also note symbols on the staffs is carried out in the form of the invention illustrated as a modification in Figures 3 and 4. I have not, however, gone into as great detail here with the colors, for it is felt that the basic theme already described will be clear inasmuch as it applies to both forms of the invention. Sufficient illustration and description is given to enable the reader to comprehend this underlying generic principle as well as the structural differences between the two species of Figures 1 and 2 on the one hand, and Figures 3 and 4 on the other. In any event, the base of wood or the like is shown in Figure 3 and is denoted by the numeral 46, and it has a rear half 48 and a forward half 50 which is fashioned to represent the keyboard. The white keys are denoted by the numerals 52 and the "black" or sharp and flat keys are denoted by the numerals 54. The frame here is denoted by the numeral 56 and it is hingedly mounted at the central portion of the base, as at 58, at which point there is a fixed lengthwise strip 60. When the frame is up in the inclined position shown, it cooperates with the base, and the strip 60 defining a music rack for the sheet music 62 and 64, as shown in Figure 3. The props or legs are denoted by the numerals 66 and they are hinged at 68 and have laterally directed rests or feet 70 at their lower ends resting on the base and held in place by retainers 72 of any suitable construction. Here again, the rack embodies longitudinal frame members 74, 76, and end members 78 and 80, and suitable wires 82 define the treble and bass staffs 84 and 86, respectively. Here again, note symbols 88 suitably colored are mounted on the wires of the respective staffs. These symbols are lined up with the correspondingly colored white and black keys on the keyboard 50.

For compactness and convenience, the staff-equipped frame 56 is folded down against the surface 48, and this expedites packaging and storing and handiness in use. When the frame is set up as shown in Figure 3, it serves, as already stated, as a rack for sheet music, and in addition, provides the same teaching and learning properties of the keys to notes and vice versa as already described in detail in reference to Figures 1 and 2. It is unnecessary, therefore, to dwell upon this color phase of the matter. It is to be mentioned, however, that the rack can be used by setting the sheets up so that the notes on the sheet correspond to the notes on the staffs. More importantly, the notes on the sheets are colored the same as those on the keys and staffs which make the device usable in connection with a technique or system of teaching music, that is, the familiarity with keyboards, the reading of music and the association between the notes on the staff, sheet music and keys, etc.

It will be observed in connection with this invention that there are seven colors only, that there are no variations. There are no complications in construction. The colored note in a white key is outstanding and easy to discern and connect up with the correspondingly colored arrangement on the note symbols on the staffs. In the plastic form of the invention, the colors are built in and the device is washable and is, indeed, a practical, sensible and educational accessory. There are no colored lines to contend with, merely matching of notes and half tones. There are no black keys, strictly speaking, to contend with. When explaining music to a class, it is much easier to slide a violet sharp (not shown) on the top line and explain why the F (violet) is made sharp in the key of G (green). Adding each sharp, it is easy to remember the notes that the color is used in "half-toning" the notes. Thus, the student strikes the half-tone of matching color.

In Figure 5, one of the wires 90 is shown. One of the note symbols is here shown at 92 and this is of plastic, metal or the like and has a bent ear or lug 94 which is secured to the wire. This serves to permanently fasten the note to the wire. Another way of doing approximately the same thing is shown in Figure 6, wherein the note symbol 96 is "threaded" on the wire 98 and is secured in place in any suitable manner. Actually, it is possible to mold the plastic symbol on the wire, if desired.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly, all suitable modifications and equivalents may be resorted to, falling within the scope of the appended claims.

What is claimed as new is as follows:

1. For use in imparting knowlege and developing the visual, physical and musical appreciation skills required by one in recognizing and learning the coordinate association between conventional musical notes and symbols applied to a standard-type music staff, the ascending, descending and other audible tones represented by said notes, and companionate relationship thereto required by one in familiarizing himself with and learning to read music and to use a piano keyboard or the like; a portable structure for student use comprising a flat faced rectangular base having one lengthwise edge portion marked off and fashioned to represent a dummy keyboard having imitation white and black keys, a frame commensurate in length with but of a width less than said base and having one longitudinal edge hinged to the intermediate portion of the top of said base, said frame being foldable against an underlying portion of said top when not in use and adapted to assume an upstanding position relative to the base when it then functions as a music rack, said frame having a series of strung wires providing music staffs, distinguishably colored disk-like note symbols mounted in prescribed order on the wires of said staffs, the color scheme of said note symbols being of a desired sequence of colors and the keys on said keyboard being likewise schematically and correspondingly colored, and stay-forming legs hingedly mounted on the respective vertical ends of said frame and having feet engageable with said base for propping and holding said frame in its rack-forming position.

2. For use in imparting knowledge and developing the visual, physical and musical appreciation skills required by one in recognizing and learning the coordinate association between conventional musical notes and symbols applied to a standard-type music staff, the ascending, descending and other audible tones represented by said notes, and companionate relationship thereto required by one in familiarizing himself with and learning to read music and to use a piano keyboard or the like; a portable structure comprising a dummy keyboard having keys imitative of the usual white and black keys of a regular keyboard, each white key having a colored note symbol thereon whereby the keys commonly known as C, D, E, F, G, A and B are capable of being recognized and distinguished by their individual color symbols, black, orange, yellow, violet, green, red and blue, in that order, said keyboard embodying a base, a strip member affixed atop the central portion of said base and extending parallel to the inward ends of the imitation keys of the dummy keyboard and constituting a music sheet ledge, a complemental frame commensurate in length with said base and strip member and having one longitudinal edge portion hinged to the central portion of said base and cooperating with said strip member and also being foldable against a cooperating portion of the base when it is not in use and being adapted to assume an upstanding position relative to the base when it combines with the strip member and functions as a rack, and means for propping and holding said frame in its rack-forming position, said frame having musical staffs thereon, bass and treble staffs, for example, and a plurality of note symbols mounted in customary ascending and descending scale order on the respective staffs with a lead-line running from each note symbol to its prescribed complemental key on said keyboard and said note symbols being likewise indicative of the tones and keys C, D, E, F, G, A and B and likewise colored black, orange, yellow, violet, green, red and blue, in that order, to thus tie in with their companion correspondingly colored keys, each "black" key being divided lengthwise into distinguishably colored halves indicative of sharps when ascending the scale and indicative of flats when descending said scale, there being five such "black" keys, and the first one, above C, being black at the left and orange at the right, the second key, above D, being orange at the left and yellow at the right, the third one, above F, violet at the left and green at the right, the fourth one, above G, green at the left and red at the right, and the final and fifth one, above A, being red at the left and blue at the right, whereby the color scheme of both sets of keys harmonize when going "up" and "down" the scale.

References Cited in the file of this patent
UNITED STATES PATENTS

| | | |
|---|---|---|
| 1,295,025 | Gray | Feb. 18, 1919 |
| 1,526,547 | Hughey | Feb. 17, 1925 |
| 1,527,824 | Armstrong | Feb. 24, 1925 |
| 1,806,964 | Bundy | May 26, 1931 |
| 1,816,865 | Newton | Aug. 4, 1931 |
| 1,833,204 | Buxton | Nov. 24, 1931 |
| 1,841,310 | Apffel | Jan. 12, 1932 |
| 2,221,143 | Lang | Nov. 12, 1940 |